US010997611B2

United States Patent
Bell et al.

(10) Patent No.: US 10,997,611 B2
(45) Date of Patent: May 4, 2021

(54) DISTRIBUTION OF MEDIA WITH TRACKING AND ANALYSIS OF MEDIA USAGE FOR ROYALTY, LOYALTY AND COLLECTION OF METADATA

(71) Applicant: Crystal Innovations, Inc., Nashville, TN (US)

(72) Inventors: Charleson S Bell, Nashville, TN (US); Charreau S Bell, Nashville, TN (US); Rocky Gray, Jr., Fairfax, VA (US); Ronnie Braxton, Lavergne, TN (US); Ja'Rell Wilson, Antioch, TN (US)

(73) Assignee: Crystal Innovations, Inc., Nashville, TN (US)

( * ) Notice: Subject to any disclaimer, the term of this patent is extended or adjusted under 35 U.S.C. 154(b) by 862 days.

(21) Appl. No.: 14/889,124

(22) PCT Filed: May 5, 2014

(86) PCT No.: PCT/US2014/036825
§ 371 (c)(1),
(2) Date: Nov. 4, 2015

(87) PCT Pub. No.: WO2014/182625
PCT Pub. Date: Nov. 13, 2014

(65) Prior Publication Data
US 2016/0086198 A1    Mar. 24, 2016

Related U.S. Application Data

(60) Provisional application No. 61/819,556, filed on May 4, 2013.

(51) Int. Cl.
*G06Q 30/02* (2012.01)
*G06F 16/951* (2019.01)
*G06F 21/10* (2013.01)

(52) U.S. Cl.
CPC ....... *G06Q 30/0201* (2013.01); *G06F 16/951* (2019.01); *G06F 21/10* (2013.01)

(58) Field of Classification Search
None
See application file for complete search history.

(56) References Cited

U.S. PATENT DOCUMENTS 7,188,263 B1 *  3/2007  Rubinstein ............ G06F 1/3209
                                                    713/300
8,255,080 B2    8/2012  Hirsh
                        (Continued)

FOREIGN PATENT DOCUMENTS

EP    2034428 A1    11/2009
EP    2934427 A1    11/2009

*Primary Examiner* — Akosua Kyereme-Tuah
(74) *Attorney, Agent, or Firm* — Baker Donelson; Carl M. Davis, II

(57) ABSTRACT

An apparatus, device and method for the distribution of media with tracking and analysis of media usage for royalty, loyalty and collection of media metadata using wireless communication such as near field communication comprised in a portable platform. Each device comprises a wireless communication arrangement capable of conducting wireless communication between wirelessly capable devices enclosed in a solid case which projects the content of the data in an illustrative depiction. Upon user prompt, the wireless communication arrangement of the physical platform establishes communication with a mobile device thus initiating the mobile device communication with a digital interface which performs digital interaction protocols for file fetching, metadata storage and metadata analysis.

34 Claims, 3 Drawing Sheets

(56) References Cited

U.S. PATENT DOCUMENTS

| | | |
|---|---|---|
| 8,275,312 B2 | 9/2012 | Fisher |
| 8,321,246 B1 | 11/2012 | Shah |
| 9,213,517 B2* | 12/2015 | Sirpal .................. G06F 1/1637 |
| 2010/0079302 A1* | 4/2010 | Eide ........................ G06F 11/32 |
| | | 340/691.8 |
| 2011/0289213 A1* | 11/2011 | Brown ................. H04N 21/254 |
| | | 709/224 |
| 2012/0290336 A1* | 11/2012 | Rosenblatt ............... H04B 5/00 |
| | | 705/5 |
| 2013/0024221 A1 | 1/2013 | Fisher |
| 2013/0077226 A1* | 3/2013 | Rayner ................. G06F 1/1613 |
| | | 361/679.26 |

* cited by examiner

DISTRIBUTION OF MEDIA WITH TRACKING AND ANALYSIS OF MEDIA USAGE FOR ROYALTY, LOYALTY AND COLLECTION OF METADATA

BACKGROUND OF THE INVENTION

Artists, writers, video editors, record labels, songwriters, composers, publishers, media generators and distributors (DISTRIBUTORS) are seeking new, innovative ways to distribute their media (such as music, books, etc. hereafter using music as the primary example) in a way to gain the attention of the populous (LOYALISTS) and increase music purchases, plays and downloads to bolster revenue. Furthermore, music licensing corporations and record labels (ROYALTISTS) are seeking new ways to collect geographical and usage information for royalty disbursement and market research purposes.

As distributors seek to increase their revenues, their major inhibitor is the effective distribution of their music. With the advent of smartphones, tablet/mobile devices, cloud computing and online media library applications (iTunes Store, Google Play, etc.), the distribution of media on physical platforms such as USB flash drives and CD-ROM has become antiquated. The loyalists instead listen to music not through CDs or flash drives but through downloaded content. Even further, loyalists have no incentive to contribute to distributor revenues by purchasing or distributing recorded material because they receive no loyalties (rewards) for the authorized (legal purchase) use of recorded material. Some have attempted to thwart this problem by creating internet-based, social media platforms for distributors to distribute music. This strategy has proven ineffective because such services have been duplicated thus diluting service capacity. Additionally, all services have become cluttered with users, further impeding their effectiveness. Most importantly, it has been thought that these services, as well as digital music distribution in general, are ineffective because of the lack of both a physical platform and the personal interaction that occurs during marketing.

As royalists seek new ways to collect geographical and usage information for royalty disbursement and market research, current platforms of both physical and digital music distribution do not readily collect the metadata surrounding music usage including time and date of use as well as demographic and geographic information. Without this data, royalists lack the ability to distribute royalties more effectively to their customers (distributors) thus financially inhibiting distributors leading to decreased music output, less distributors doing business, and revenue loss for royalists.

Near Field Communication (NFC) is a form of contactless communication between mobile devices such as smartphones or tablets [1]. Contactless communication allows a user to wave the smartphone over a NFC compatible device to send information without needing to touch the devices together or go through multiple steps setting up a connection. Bluetooth, Wi-Fi and NFC allow wireless communication and data exchange between digital devices; however, NFC utilizes electromagnetic fields while technologies such as the aforementioned utilize radio waves [2].

NFC devices may be "active" or "passive". A passive device, such as an "NFC tag", contains information that other devices can read but does not read any information itself; thus only supporting information transmission to authorized devices. Active devices, such as a smartphone mobile device, can both read and send information. In order to transmit, devices must be with 4 cm of each other before information can be transmitted. The active NFC device (mobile device) is known as the interrogator while the tag is simply referred to as a tag. To function, the interrogator sends out a signal to the tag. If the devices are close enough together, the tag becomes powered by interrogator's signal. This signal powers the tag, allowing the tag to occupy a small footprint without additional power supply.

The two devices create a high frequency magnetic field between the loosely coupled coils in both the interrogating device and the NFC tag. Once the field has been established, a connection is formed and information can be passed between the interrogator and the tag. Once this field is established, a connection is formed and information can be passed from the tag to the interrogator. Commands are transmitted from the interrogator using phase jitter modulation to modify the surrounding field and send out a signal. The tag responds using inductive coupling by sending a charge through the coils comprised in the tag.

Such NFC technology is readily used in credit card payments, payment via smartphone or mobile device, building and facility security access [3], sharing files between mobile devices [4]. One company has utilized very complex NFC technology to open music files and video files from internet servers [5].

BRIEF SUMMARY OF THE INVENTION

This disclosure provides an apparatus for the distribution of media and tracking of media usage and metadata, said apparatus comprising of a device for wireless communication and encasement of said device. Each device comprises a wireless communication arrangement capable of conducting wireless communication between wirelessly capable devices enclosed in a solid case which projects the content of the data in an illustrative depiction.

This disclosure provides methods for the distribution of media and tracking of media usage and metadata, said methods including digital interaction protocols for file fetching, metadata storage and metadata analysis. The digital interaction protocols comprise of interaction and communication between digital 'objects' which perform actions while storing self-descriptive data. The digital interaction protocols comprise of communication between a client object and the communication manager object, both of which can be comprised of multiple subroutines and/or objects. The communication manager object acts as relay which both provides server stored media to the client while simultaneously storing metadata regarding the client's location, client's digital identification, timestamp-of-transfer, count of transfers per media file, count of transfers per client and client demographic data as permissibly shared by the client. Metadata may be displayed using a web analytics processing application.

This disclosure provides methods for use of device (by the loyalist) with current mobile platforms containing wireless communication transceivers. The device, as prompted by the loyalist, will initiate the communication process with the mobile platform. The mobile platform will initiate the internet protocols for file fetching, metadata storage and metadata analysis. The user will be provided multiple options for use of the fetched file, where the loyalist's usage will be recorded for loyalty disbursement.

More particularly, the present invention provides apparatus for the distribution of media and tracking of media usage and metadata, comprising:

a physical platform, comprising:
  an arrangement capable of wireless communication; and
  a solid enclosure or encasement; and
  wherein an illustration of the media depicted on or through the encasement;
  wherein instructions for communication to mobile devices are imbedded within;
a mobile device, comprising:
  an arrangement capable of wireless communication and media use;
  wherein the device is capable of communicating wirelessly with a physical platform and a digital interface; and
a digital interface, comprising:
  an arrangement of digital objects in the form of a user interface and digital interaction protocols;
  wherein the digital interaction protocols comprise of communication between a client object and the communication manager object;
  wherein the client object are digital routines on the mobile device;
  wherein the communication manager object acts as a relay which provides both server stored media to the client while simultaneously storing metadata regarding the transaction;
  wherein when the physical platform is prompted by the user, the wireless communication arrangement communicates with the mobile device;
  wherein the mobile device communicates with the digital interface containing the digital interaction protocols;
  wherein the digital interaction protocols performs file fetching, metadata storage and metadata analysis;
  wherein the client object receives media for use; and
  wherein the communication manager object stores and analyzes metadata.

In another aspect, the present invention provides a method for the distribution of media for tracking and analysis of media usage for royalty, loyalty and collection of media metadata using wireless communication such as near field communication comprised in a portable platform, comprising the steps of:
  establishing communication with a mobile device configured for communication with a digital interface that performs digital interaction protocols for file fetching, metadata storage and metadata analysis;
  communicating a request for a digital media file between a client object and a communication manager object;
  relaying by the communication manager the requested digital media to the client object;
  storing metadata regarding the client's location, client's digital identification, timestamp-of-transfer, count of transfers per media file, count of transfers per client and client demographic data as permissibly shared by the client; and
  reporting to a distributor the transfer of the digital media file.

Objects, advantages, and features of the present invention will be readily apparent from a reading of the following detailed description with reference to the drawings and the appended claims.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
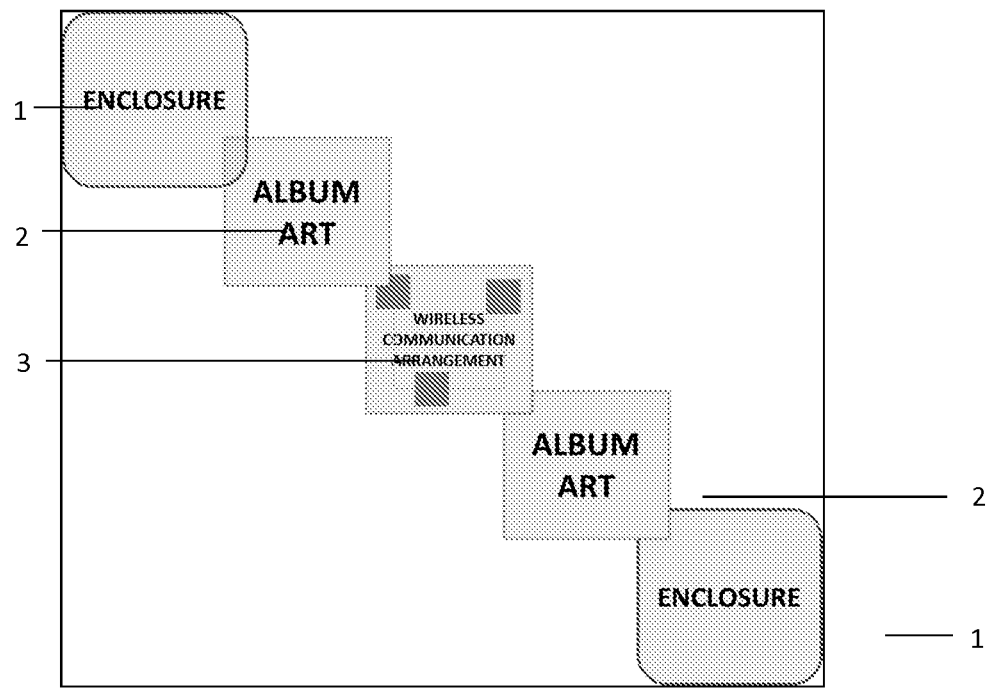
FIG. 1 is a schematic showing the composition of the portable media device apparatus.

This disclosure provides apparatus, devices, and methods for the distribution of media with tracking and analysis of media usage for royalty and collection of media metadata using wireless communication such as near field communication comprised in a portable platform. The physical platform (FIG. 1) may have the ability to interface with current and future mobile or stationary devices via wireless communication (such as NFC). The media that the platform is primed to distribute may be depicted or illustrated on or through the encasing of the physical platform 2; for example, taking the form of a book cover or album cover. The platform may be utilized by initiating the platform's wireless communication arrangement 3; for example, NFC enabled physical platforms will be brought within four cm of the mobile device to initiate NFC connection. This will initiate the download of the media content, as directed from the primed physical platform, from the digital interface to the platform.

The apparatus, devices and methods may provide a physical platform for the distribution of media as utilized by a distributor and accepted for use by a royalist. The distributor seeks to earn royalties from the royalists as a result of the platform's use by the loyalist. Upon use of the platform by the loyalist, the metadata generated by its use will be stored, analyzed and provided to royalists for disbursement to distributors. Upon use of the platform by the loyalist the metadata generated by its use will be stored, analyzed and provided to the distributor for market analysis and disbursement of loyalties (rewards) to the loyalists. The platform provides the missing link to an effective, profitable relationship between loyalists, distributors and royalists.

The apparatus, devices and methods may be used, as a result of the above and for example, to distribute media (such as music; music used descriptively hereafter as an example) in a physical platform in order to track and analyze the usage of the media to assist in the disbursement of royalties, loyalties, and the collection of metadata for market research purposes. The apparatus, devices and methods may be used, for example, to provide royalists with analytics which provide the data necessary to more effective disburse royalties to distributors. The apparatus, devices and methods may be used, for example, to provide distributors with analytics which provide the data necessary to more effective research the market climate and interest regarding certain media via geographic, demographic and usage analysis. The apparatus, devices and methods may be used, for example, to provide loyalists the opportunity to be rewarded via loyalties by the distributor for the use, purchase or distribution of the media via use of the portable media platform.

Figure 2:
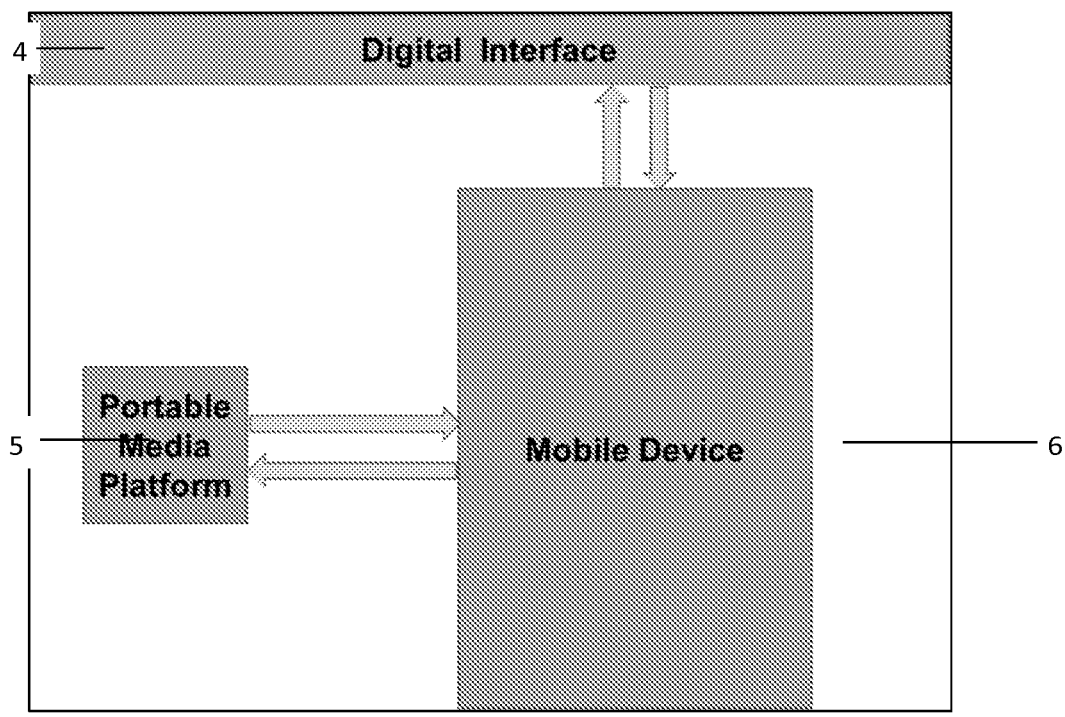
FIG. 2 is a schematic showing the communication pathway between the portable media device, the mobile device, and the digital interface which houses the communication manager.
Figure 3:
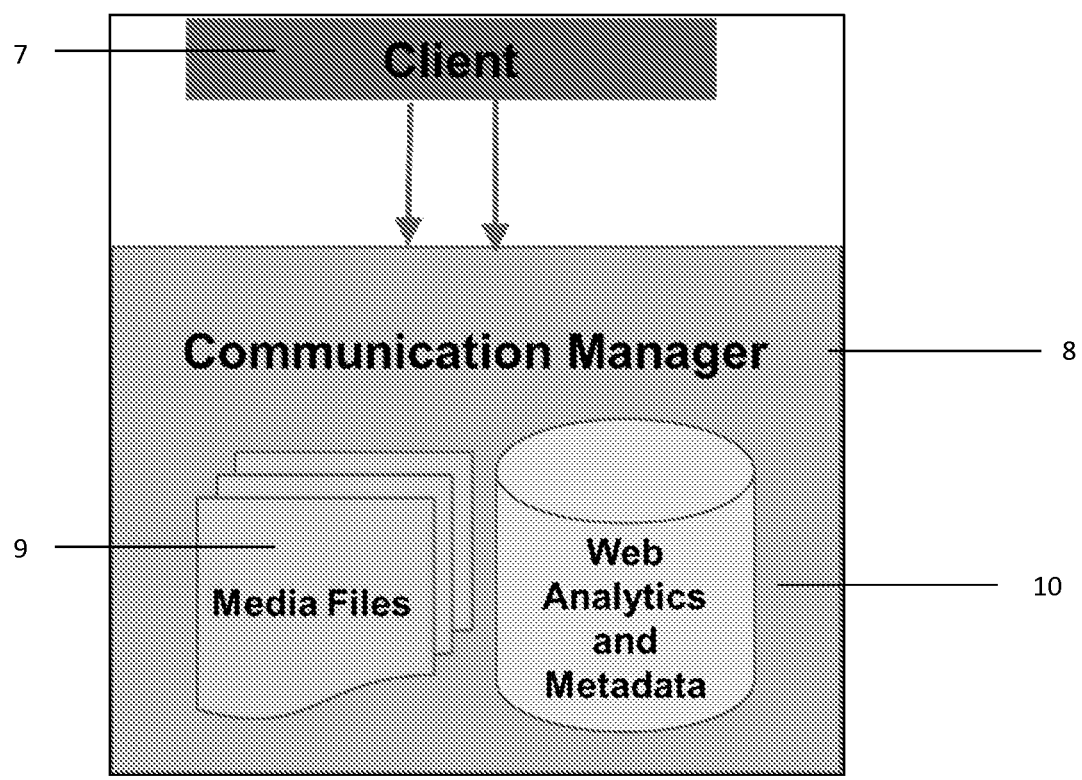
FIG. 3 is an illustration showing the flow of the digital interaction protocols between the client object and the communication manager object.
Figure 4:
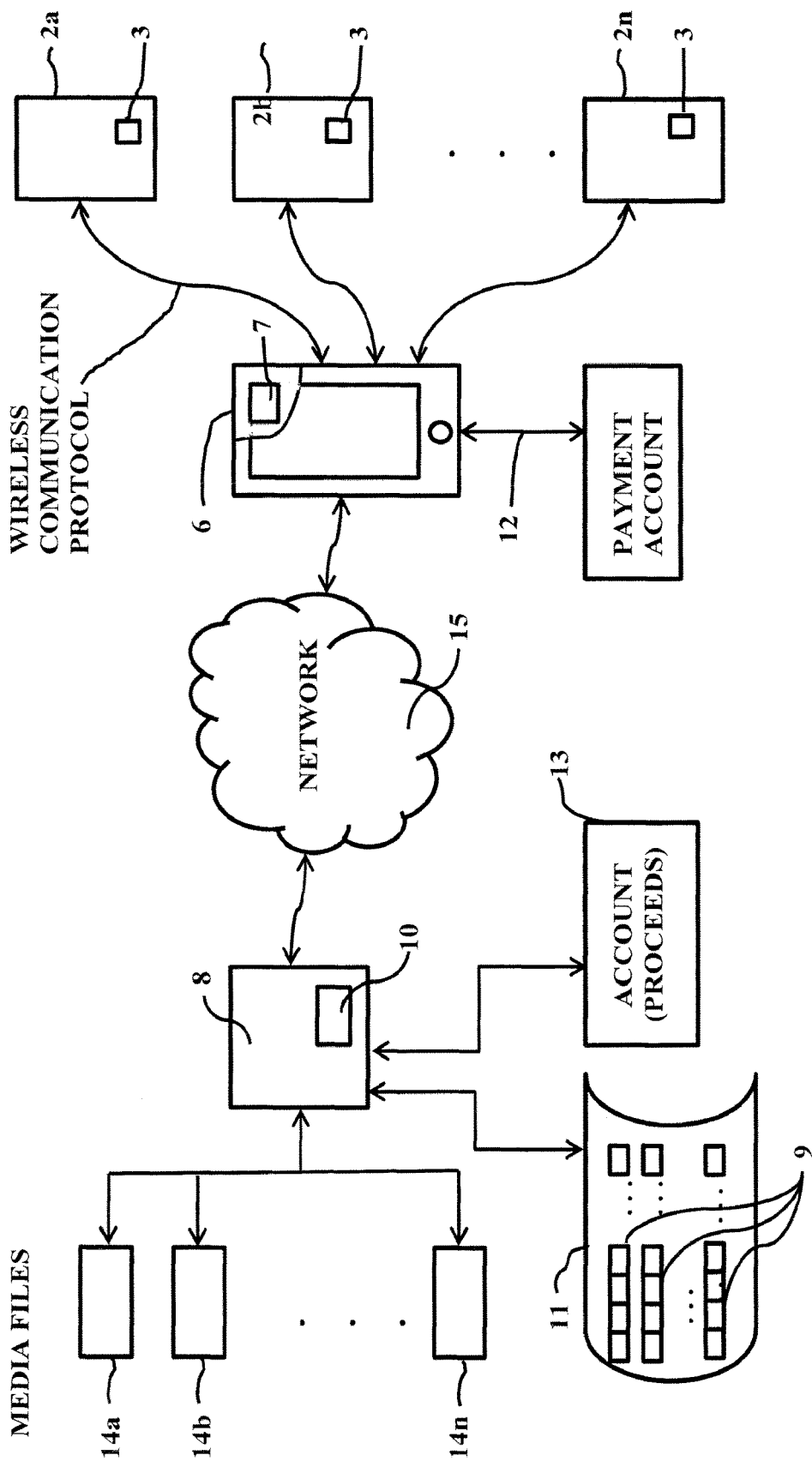
FIG. 4 illustrates a schematic view of an apparatus for distribution of media for tracking and analysis of media usage for royalty, loyalty and collection of media metadata according to the present invention.

The description below, with reference to FIGS. 2-4 provide additional details of the methods, devices and apparatus of this disclosure:

Communication Pathway between Physical Platform, Mobile Device and Digital Interface As shown in FIG. 2, the physical platform 5 communicates with the mobile device 6 thus initiating the communication of the mobile device with the digital interface 4 which facilitates the digital download of the desired media. The platform may be utilized by initiating the platform's wireless communication arrangement 3. In an aspect, by way of example and not limitation, NFC enabled physical platforms will be brought within four cm of the mobile device to initiate NFC connection. This will prompt the mobile device 6 to check the physical platform for instructions to regarding fetching the desired media. Upon receiving these instructions the mobile device will communicate with the digital interface and fetch the desired media while the digital interface simultaneously collects metadata on the transactions. Other wireless communication technologies such as Wi-Fi, Bluetooth, RFID (radio-frequency identification) or QR-code (quick response code) imaging as a wealth of other wireless communication strategies can be utilized in this methodology as well.

In an aspect, the mobile device may be a smartphone, tablet or other computing platform such as a laptop or hybrid platform.

In an aspect, the digital interface can be a web application or website stored via a server.

Flow of Digital Interaction Protocols

As shown in FIG. 3., the digital interaction protocols comprise of interaction and communication between 'objects'—defined as code mechanisms with an identity (distinguishing it from other objects), state (data stored in the object), and behavior (methods by which the object can be used) that allows them perform actions while storing self-descriptive data. The digital interaction protocols comprise of communication between a client object 7 and the communication manager 8 object, both of which can be comprised of multiple subroutines and/or objects. The communication manager object acts as relay which provides both server stored media to the client while simultaneously storing metadata 9 regarding the client's location, client's digital identification, timestamp-of-transfer, count of transfers per media file, count of transfers per client and client demographic data as permissibly shared by the client. In an aspect, the metadata is stored in table form. Metadata described herein is utilized by example and not by limitation. In an aspect, metadata may be displayed for distribution or further storage using a web analytics processing application 10 such as Google Analytics, Optimizely, or Adobe SiteCatalyst.

In an aspect, the communication manager object is customarily a software component that processes and stores data related to the interactions between a visitor and media files.

In an aspect, the client represents the user's mobile device or computing platform.

FIG. 4 illustrates a schematic view of an illustrative embodiment of an apparatus for distribution of media files 2 provided by content distributors 14 for tracking and analysis of media usage for royalty, loyalty and collection of media metadata according to the present invention. The mobile device 6 placed in near field communication with a selected one of a plurality of media files 2a initiates communication with the near field communications device housed in an encasement. This initiates digital interaction protocols for file fetching, metadata storage and metadata analysis. (The media file 2b is remote from the mobile device but is capable of wireless communion upon initiation by signal from the mobile device of the requester or of another requester.). The mobile device 6 selectively communicates a request for the digital media file between a client object 7 and a communication manager object 8. The communication manager object 8 relays the requested digital media to the client object; for example, providing an authorization code that the mobile device 6 communicates to the media file 2a for authorization transfer of the media file to the mobile device. Alternative, the communication manager object 8 may communicate the digital file directly to the mobile device 6 through a communications network 15 or may communicate the authorization code to the digital file for transfer to the mobile device. The communication manager object 8 further stores in an electronic database 11 the metadata 9 regarding the mobile device location and client's digital identification, timestamp-of-transfer, count of transfers per media file, count of transfers per client and other client demographic data as permissibly shared by the client. Periodically, the communication manager object 8 reports to the distributors the metadata for the particular distributors' digital files transferred to mobile devices for accounting, royalties, and tracking. In the illustrative embodiment, the communication manager object attends to payment 12 for the transfer of the digital media directly from the mobile device 6. The payment transfers to the account 13 from which royalties are subsequently paid by the communication manager object 8 to the respective distributor 14 of the digital media 2. The communication manager object 8 may periodically provide incentives as a reward for media file purchases by the requester using the mobile device 6.

Further, the mobile device selectively projects at least some of the content of the digital media file on a display of the mobile device without revealing the virtual location of the content of the digital media file.

Advantages

Overall, this disclosure provides an apparatus, devices and methods that simultaneously offer five major technical advantages over other technologies:

1. The devices and apparatus provide a physical platform which can facilitate the transfer of media to mobile devices and other computing platforms;

2. The devices, apparatus and methods allow the collection of metadata per media use for use by royalists for the disbursement of royalties and distributors for market research;

3. The devices, apparatus and methods provide the loyalist the ability to obtain an incentive in the form of loyalties to procure authorized media and to further distribute the authorized media to others;

4. The devices, apparatus and methods provide the distributors the ability to distribute their media in a physical platform and obtain royalties per authorized use of media distributed via the physical platform 5. The apparatus, devices and methods are easy to use, thus obviating the need for advanced instruction The present invention provides an apparatus, device and method for the distribution of media with tracking and analysis of media usage for royalty, loyalty and collection of media metadata using wireless communication such as near field communication comprised in a portable platform. Each device comprises a wireless communication arrangement capable of conducting wireless communication between wirelessly capable devices enclosed in a solid case which projects the content of the data in an illustrative depiction. Upon user prompt, the wireless communication arrangement of the physical platform establishes communication with a mobile device thus initiating the mobile device communication with a digital interface which performs digital interaction protocols for file fetching, metadata storage and metadata analysis. The digital interaction protocols comprise of communication between a client object and the communication manager object, both of which can be comprised of multiple subroutines and/or objects. The communication manager object acts as relay which both provides server stored media to the client while simultaneously storing metadata regarding the client's location, client's digital identification, timestamp-of-transfer, count of transfers per media file, count of transfers per client and client demographic data as permissibly shared by the client. This apparatus, device and method provides: a physical platform which can facilitate the transfer of media to mobile devices and other computing platforms; the collection of metadata per media use for use by royalists for the disbursement of royalties and distributors for market research; the loyalist, the ability to obtain an incentive in the form loyalties to procure authorized media and to further distribute the authorized media to others; the distributors, the ability to distribute their media in a physical platform and obtain royalties per authorized use of media distributed via the physical platform.

The methods and apparatus disclosure herein are not limited in their applications to the details of construction and the arrangement of components described herein. The invention is capable of other embodiments and of being practiced or of being carried out in various ways. Also it is to be understood that the phraseology and terminology used herein is for the purpose of description only, and should not be regarded as limiting. Ordinal indicators, such as first, second, and third, as used in the description and the claims to refer to various structures, are not meant to be construed to indicate any specific structures, or any particular order or configuration to such structures. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention.

Further, no admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

REFERENCES

[1] U.S. Pat. No. 20130024221
[2] U.S. Pat. No. 8,275,312
[3] U.S. Pat. No. 8,321,246
[4] European Patent No. 2,034,428
[5] U.S. Pat. No. 8,255,080

What we claim is:

1. An apparatus for the distribution of a digital media product and tracking of media usage and metadata, comprising:
   a physical platform having a first state and a second state, comprising:
      an arrangement capable of proximity wireless communication for receiving an initiation signal from a mobile device and in response changing from the first state to the second state, the physical platform in said first state is electrically inactive and in said second state is electrically active;
      an authorization code for a digital media product for selective distribution by the proximity wireless communication arrangement in the second state to the mobile device in response to the initiation signal communicated to the proximity wireless communications arrangement; and
      an encasement,
   wherein the proximity wireless communication arrangement is primed to distribute the digital media product associated with the authorization code;
   the mobile device, comprising:
      a device for communicating the initiation signal to the physical platform;
      an arrangement capable of proximity wireless communication and of network wireless communication, and for use of the digital media product upon receiving same following interaction with the physical platform;
      wherein the mobile device is capable of proximity wireless communication with the physical platform and network wireless communication with a digital interface; and
      a client object comprising operative digital routines on the mobile device configured for selective proximity wireless communicating with the physical platform for receiving the authorization code and network wireless communicating with the digital interface for fetching a file or folder of the digital media product associated with the authorization code_to the mobile device; and
   the digital interface, comprising:
      an arrangement capable of network wireless communication with the mobile device;
      an arrangement of digital objects in the form of a user interface and digital interaction protocols;
      wherein the digital interaction protocols comprise instructions for network communication between the client object of the mobile device and a communication manager object;
   wherein the communication manager object, in response to receiving the authorization code network communicated from the mobile device, relays by network wireless communication the digital media product to the client object and stores metadata regarding a transaction of acquisition and use of the media product on the mobile device;
   wherein when the physical platform is prompted by the mobile device with the initiation signal and changes from the first state to the second state to be electrically active, the proximity wireless communication arrangement thereof communicates the authorization code to the mobile device;

wherein the mobile device network communicates the authorization code to the digital interface containing the digital interaction protocols;

wherein the digital interaction protocols perform the file fetching of the digital media product associated with the authorization code, the metadata storage, and the metadata analysis;

wherein the client object receives the digital media product for use; and wherein the communication manager object stores and analyzes the metadata.

2. The apparatus of claim 1, wherein the arrangement of the physical platform and the mobile device capable of proximity wireless communication comprises near field communication apparatuses.

3. The apparatus of claim 2, wherein the arrangement capable of proximity wireless communication comprises at least one wireless communication protocol selected from the group comprising NFC, Bluetooth, Wi-Fi, RFID, apparatuses for QR-code identification and a combination thereof.

4. The apparatus of claim 1, wherein the encasement comprises plastic, metal or glass.

5. The apparatus of claim 4, wherein the encasement may be opaque, translucent or transparent.

6. The apparatus of claim 1, the encasement further comprises an illustration of the digital media product to be transmitted to the client object.

7. The apparatus of claim 6, wherein the illustration depicts the media product as an album cover art, a book cover, the cover page of a document or a thumbnail image of a video.

8. The apparatus of claim 1, wherein instructions for communication to mobile devices imbedded within the physical platform are digital directions for directing the activities of the digital object.

9. The apparatus of claim 8, wherein the instruction for communication appear in the form of a uniform resource locator (URL).

10. The apparatus of claim 1, wherein the mobile device is a smartphone, tablet, or portable computing device.

11. The apparatus of claim 1, wherein the arrangement of proximity wireless communication on the mobile device is configured for Bluetooth, Wi-Fi, RFID transceiver, and QR code capture and analysis communications.

12. The apparatus of claim 1, wherein the arrangement for media use on the mobile device is a media application configured for use of the digital media product downloaded by the communication manager object.

13. The apparatus of claim 1, wherein the mobile device is configured for network wireless communication with the digital interface through Bluetooth, Wi-Fi, RFID, or QR code communications systems.

14. The apparatus of claim 13, wherein the communication protocols may be used interchangeable between the physical platform and the digital interface.

15. The apparatus of claim 1, wherein an arrangement of digital objects in the form of a user interface and digital interaction protocols are an arrangement of digital or web applications.

16. The apparatus of claim 1, wherein the client object and the communication manager object comprise multiple subroutines and objects.

17. The apparatus of claim 1, where the client object uniquely identifies a user and network communicates to the communication manager object the digital media product requested by the user.

18. The apparatus of claim 1, wherein the communication manager object consists of object subroutines that analyze the information provided by the client object, allows access to the requested digital media product, and logs the transaction in a metadata database.

19. The apparatus of claim 1, wherein the physical platform when prompted by proximity communication from a user communicates with the mobile device.

20. The apparatus of claim 19, wherein the user prompts the proximity communication by the physical platform by bringing the mobile device within 4 cm of the physical platform.

21. The apparatus of claim 1, wherein the metadata obtained includes location of a user at time of a transaction, a digital identification, a timestamp-of-transfer, a count of transfers per digital media product, a count of transfers per user and a user demographic data selectively shared by the client object.

22. The apparatus of claim 1, wherein the metadata analysis tools are configured for analyzing, measuring, profiling, and creating visual reports of metadata stored by the communication manager.

23. The apparatus of claim 1, wherein the metadata stored by the communication manager object is used for the distribution of royalties, loyalties and market research.

24. A method for the distribution of media for tracking and analysis of media usage for royalty, loyalty and collection of media metadata using wireless communication comprised in a portable platform, comprising the steps of:

establishing proximity communication with a portable platform having a first state and a second state, by a mobile device having a client object for receiving from the portable platform in the second state an authorization code associated with a digital media product and further configured for network communication with a digital interface having a communication manager object that performs digital interaction protocols for file fetching, metadata storage and metadata analysis, the portable platform in said first state is electrically inactive and in said second state is electrically active and configured for changing from the first state to the second state to be electrically active upon receiving a proximity signal from the mobile device;

network communicating the authorization code as a request for a digital media file between the client object and the communication manager object;

relaying by the communication manager object the requested digital media file to the client object;

storing metadata regarding a location of the mobile device, a unique digital identification associated with the mobile device, a timestamp-of-transfer, a count of transfers per media file, a count of transfers per client and a client demographic data as permissibly shared by the client object; and reporting to a distributor the transfer of the digital media file.

25. The method as recited in claim 24, wherein the mobile device comprises a proximity wireless communication arrangement capable of conducting proximity wireless communication with a proximity wireless communication capable device enclosed in a case.

26. The method as recited in claim 24, further comprising the step of projecting at least some of the content of the digital media file on a display of the mobile device.

27. The method as recited in claim 24, further comprising the step of projecting at least some of the content of the digital media file on a display of the mobile device without revealing the virtual location of the digital media file.

28. The method as recited in claim 24, further comprising the step of prompting network communication by the mobile device to the digital interface to initiate communications with the communications manager object.

29. The method as recited in claim 24, wherein the communications manager object accesses from a plurality of distributors of a plurality of digital media files for selectively transferring of at least one of the plurality of digital media files pursuant to the request transmitted by the mobile device.

30. The method as recited in claim 24, further comprising the step of providing an incentive to a requester in response to the requester requesting transfer of at least one digital media file.

31. The method as recited in claim 24, further comprising the step of transmitting a royalty to a distributor of the digital media file transferred by the communications manager object to the client object operative on the mobile device.

32. The method as recited in claim 24, wherein the step reporting comprises providing the distributor with the collected metadata for the digital media file transferred at the request communicated by the mobile device.

33. The method as recited in claim 24, wherein the communications manager object attends to reeving payment from an account of a requester using the mobile device for transfer of the requested media data file.

34. An apparatus for the remote distribution of media and tracking of media usage and metadata, comprising:
- a physical platform having a first state and a second state and comprising a platform arrangement capable of proximity wireless communication, wherein the platform arrangement is primed to distribute in the second state a media product and configured with instructions for proximity communication with a mobile device, the physical platform in said first state is electrically inactive and in said second state is electrically active;
- the mobile device comprising a device arrangement capable of proximity wireless communication and network wireless communication and a client object comprising operative digital routines for receiving and using the media product on the mobile device, the device arrangement configured for the mobile device proximity wireless communication with the physical platform and network wireless communication with a digital interface, and a device for communicating an initiation signal to the physical platform to change the physical platform to the second state; and
- the digital interface comprising an interface arrangement of digital objects in the form of a user interface and a plurality of digital interaction protocols that comprise instructions for network wireless communication through the user interface with the client object and with a communication manager object;
- wherein the communication manager object relays the media product from a remote storage server to the client object while storing metadata regarding a transaction for acquisition and use of the media product by a user;
- wherein, the physical platform being prompted by the mobile communication device to change from the first state to the second state to be electrically active, the proximity wireless communication arrangement communicates an authorization code to the mobile device;
- wherein the mobile device communicates the received authorization code to the digital interface;
- wherein the digital interaction protocols perform file fetching of the media product associated with the authorization code and storing and analyzing of a metadata associated with the fetching of the media product;
- wherein the digital interface network wireless communicates the media product to the client object for use on the mobile device; and
- wherein the communication manager object stores and analyzes the metadata.

\* \* \* \* \*